United States Patent
Schalles et al.

(10) Patent No.: US 11,703,396 B2
(45) Date of Patent: Jul. 18, 2023

(54) MEASURING INSERT WITH STATE MONITORING

(71) Applicant: Endress+Hauser Wetzer GmbH+Co. KG, Nesselwang (DE)

(72) Inventors: Marc Schalles, Erfurt (DE); Thomas Fröhlich, Ilmenau (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 273 days.

(21) Appl. No.: 17/273,389

(22) PCT Filed: Aug. 13, 2019

(86) PCT No.: PCT/EP2019/071651
§ 371 (c)(1),
(2) Date: Mar. 4, 2021

(87) PCT Pub. No.: WO2020/048743
PCT Pub. Date: Mar. 12, 2020

(65) Prior Publication Data
US 2021/0247245 A1    Aug. 12, 2021

(30) Foreign Application Priority Data
Sep. 4, 2018 (DE) .................... 10 2018 121 494.4

(51) Int. Cl.
*G01K 11/06* (2006.01)
*G01K 7/02* (2021.01)
*G01K 7/16* (2006.01)

(52) U.S. Cl.
CPC ............... *G01K 11/06* (2013.01); *G01K 7/02* (2013.01); *G01K 7/16* (2013.01)

(58) Field of Classification Search
USPC ...................................... 374/163, 179, 183
See application file for complete search history.

(56) References Cited

U.S. PATENT DOCUMENTS 3,499,310 A * 3/1970 Buschfort ............. G01K 15/00
374/1
4,011,525 A * 3/1977 Godard .................. H01S 3/0973
343/840
(Continued)

FOREIGN PATENT DOCUMENTS

CN 101745819 A 6/2010
CN 103154686 A 6/2013
(Continued)

OTHER PUBLICATIONS

Translation of DE102006031905A1 (Year: 2008).*
Translation of DE102016123856A1 (Year: 2018).*

*Primary Examiner* — Mirellys Jagan
(74) *Attorney, Agent, or Firm* — Christopher R. Powers; Endress+Hauser (USA) Holding, Inc.

(57) ABSTRACT

The present disclosure relates to an apparatus for determining and/or monitoring a process variable of a medium, comprising at least one sensor element arranged in a sensor head for determining and/or monitoring the process variable, wherein an internal volume of the sensor head is filled at least partially with a filler. The filler includes at least one fill material, for which at at least one predeterminable phase transformation temperature a phase change occurs, in which the material remains in the solid state, wherein the fill material is in a first phase state when a temperature of the fill material is less than the phase transformation temperature, and wherein the fill material is in a second phase state when the temperature of the fill material is greater than the phase transformation temperature.

16 Claims, 3 Drawing Sheets

(56) References Cited

U.S. PATENT DOCUMENTS

| | | |
|---|---|---|
| 8,308,356 B2 | 11/2012 | Melgaard |
| 2007/0242727 A1 | 10/2007 | Hilgers |
| 2012/0051389 A1 | 3/2012 | Schalles et al. |
| 2012/0128030 A1 | 5/2012 | Suess et al. |
| 2015/0285693 A1* | 10/2015 | Schalles ............... G01K 15/002 374/1 |
| 2019/0353529 A1* | 11/2019 | Schalles ................. G01K 3/005 |

FOREIGN PATENT DOCUMENTS

| | | | | |
|---|---|---|---|---|
| CN | 104697374 A | | 6/2015 | |
| CN | 105318764 A | | 2/2016 | |
| CN | 206546176 U | | 10/2017 | |
| CN | 107820565 A | | 3/2018 | |
| CN | 108027286 A | | 5/2018 | |
| CN | 110168327 A | * | 8/2019 | ........... G01K 15/002 |
| CN | 110168329 A | * | 8/2019 | ............. G01K 15/00 |
| CN | 110234970 A | * | 9/2019 | ............. G01K 11/00 |
| DE | 102005032134 A | | 1/2007 | |
| DE | 102006031905 A1 | | 1/2008 | |
| DE | 102010040039 A1 | * | 3/2012 | ........... G01K 15/002 |
| DE | 102010040039 A1 | | 3/2012 | |
| DE | 102012112575 A1 | | 7/2014 | |
| DE | 102016123856 A1 | * | 6/2018 | ............. G01K 11/00 |
| DE | 102017100264 A1 | | 7/2018 | |
| DE | 102017100266 A1 | | 7/2018 | |
| GB | 2011169 A | | 7/1979 | |
| JP | 05273162 A | | 10/1993 | |

\* cited by examiner

MEASURING INSERT WITH STATE MONITORING

CROSS-REFERENCE TO RELATED APPLICATIONS

The present application is related to and claims the priority benefit of German Patent Application No. 10 2018 121 494.4, filed on Sep. 4, 2018, and International Patent Application No. PCT/EP2019/071651, filed on Aug. 13, 2019, the entire contents of which are incorporated herein by reference.

TECHNICAL FIELD

The invention relates to an apparatus for determining and/or monitoring a process variable of a medium, comprising a sensor element arranged in a sensor head for determining and/or monitoring the process variable. Furthermore, the invention relates to a method for monitoring state of an apparatus of the invention.

BACKGROUND

Field devices serve for monitoring and/or determining variables of a medium, for example, chemical or physical, process variables of a medium. In the context of the present invention, in principle, all measurement devices are referred to as field devices, which are applied near to a process and which deliver, or process, process relevant information, thus, also remote I/Os, radio adapters, and, generally, electronic components, which are arranged at the field level. A large number of such field devices are produced and sold by the Endress+Hauser group of companies.

Examples of such field devices are fill level measurement devices, flow measurement devices, pressure- and temperature measurement devices, pH- and/or pH-redox potential measurement devices, and conductivity measurement devices, which serve to register corresponding process variables, fill level, flow, pressure, temperature, pH value, redox potential, and conductivity. The measuring principles of these measurement devices are sufficiently known in the state of the art and are not individually set forth here.

In the case of flow measurement devices, such are, for example, Coriolis-, ultrasonic-, vortex-, thermal and/or magnetically inductive, flow measurement devices. Fill level measurement devices, in turn, are, for example, microwave fill level measurement devices, ultrasonic, fill level measurement devices, time domain reflectometric, fill level measurement devices (TDR), radiometric, fill level measurement devices, capacitive, fill level measurement devices, conductive, fill level measurement devices and/or temperature sensitive, fill level measurement devices. In the case of pressure measurement devices, in contrast, there are absolute-, relative- and difference pressure devices, while a temperature measurement device has, for example, a thermocouple or a temperature dependent resistance for ascertaining the temperature.

A field device includes at least one sensor unit coming at least partially and at least at times in contact with the process and an electronics unit, which serves, for example, for signal registration, evaluation and/or feeding. Usually, field devices are only designed for certain, predeterminable application areas, especially as regards various environmental parameters. Especially important in this connection is the temperature. For a field device, usually a certain temperature range is defined, within which the field device can be applied. If the field device is used, for example, at too high operating temperatures, then it can come to defects all the way to total failure of the field device. Whether a field device was exposed to too high temperatures over a certain time period can in many cases, however, not be detected in simple manner.

In this regard, known, for example, from DE102006031905A1 is an apparatus for determining and/or monitoring at least one process variable of a medium. The apparatus includes a sensor unit, a housing and a temperature exceedance element. The temperature exceedance element is mounted in or on the housing and comprises a piezoelectric element, wherein the Curie temperature of the piezoelectric element is selected in such a manner that the Curie temperature lies in the region of a monitored temperature of the apparatus. In order to find out, whether the monitored temperature has been exceeded, however, disadvantageously, the temperature exceedance element has to be removed from the housing, or, at least, be embodied in such a manner that the polarization of the temperature exceedance element is queryable in the installed state. This requires a special embodiment of the measurement device.

Known, furthermore, from DE102005032134A1 is a field device with an impedance measuring unit for determining the electrical resistance of the sensor unit and/or the electrical connection. In this way, defects of the sensor unit and/or from electrical connection elements, for example, connection wires, can be detected. As regards maximum allowable operating temperature of the field device, this route, however, only provides information, when the operating temperature has already led to damage of the sensor unit and/or the electrical connection elements.

Additionally, the state of the art provides the most varied of temperature switches, which use, for example, bimetals, and even phase changes from the solid state into the liquid state or vice versa, in order to detect the exceeding of a certain value for the temperature. In such case, however, involved frequently are separate sensor units, which must be implemented together within the particular field device. Such can, in given cases, be complicated.

SUMMARY

An object of the present invention, therefore, is to provide a way, in which, in simple manner, it can be detected, whether a field device is being/was exposed to too high operating temperatures.

As regards apparatus, the object of the invention is achieved by an apparatus for determining and/or monitoring a process variable of a medium, comprising at least one sensor element arranged in a sensor head for determining and/or monitoring the process variable, wherein at least one portion of an internal volume of the sensor head, in which the sensor element is arranged, is filled at least partially, for example, completely, with at least one filler. According to the invention, the filler comprises a fill material, for which at at least one predeterminable phase transformation temperature a phase change occurs, in the case of which the material remains in the solid state, wherein the fill material is located in a first phase state, when temperature of the fill material is less than the phase transformation temperature, and wherein the fill material is located in a second phase state, when temperature of the fill material is greater than the phase transformation temperature.

In the case of a phase change in a material, which remains in the solid state, such is, for example, according to the Ehrenfest classification, a phase change of at least second order. In contrast with a phase change of first order, no or only a negligible amount of latent heat is released during the phase change. When no or only a negligible amount of latent heat is released, it can—basically and independently of the selected classification for phase changes—among other things, be advantageously assured that the temperature measured by means of the sensor element at the point in time of the occurrence of a phase change is not corrupted, for example, not by released, latent heat.

In an additional, significantly more usable classification of phase changes in the present state of the art, one distinguishes only between discontinuous (First Order) and continuous (Second Order) phase changes [s. e.g. Lexikon der Physik, Spektrum Akademischer Verlag, Heidelberg Berlin, Vol. 4, under the heading, "Phasenubergange und andere kritische Phanomene (phase changes and other critical phenomena)"]. According to this classification, different ferroelectric materials can have, for example, both phase changes of First Order as well as well as also phase changes of Second Order, wherein, in both cases, the particular material, in the case of which a phase change takes place, remains in the solid state during the phase change.

The remaining in the solid state is important for the present invention, independently of the selected classification of a phase change. A material remaining in the solid state is, for example, advantageous for structural aspects of the apparatus.

The filler can, on the one hand, be provided exclusively by the at least one fill material. The filler can, however, for example, also be a mixture of the at least one fill material and at least one additional material, or a mixture of at least two different fill materials. Also, an option is that different portions of the internal volume, in which the sensor element is arranged, are filled with different fillers and/or fill materials.

Each fill material has one or more phase changes at, in each case, a predeterminable phase transformation temperature. In the case, in which an apparatus is to be provided, for which the filler has at least two phase changes, such can correspondingly be achieved especially by use of a single fill material having a plurality of phase changes at different phase transformation temperatures or by use of a number of fill materials, which, in each case, have at least one phase change at phase transformation temperatures differing from one another.

In an advantageous embodiment, the apparatus is embodied to detect, whether the fill material is located in the first and/or second phase state. For example, the apparatus includes a detection unit, which is embodied to detect, whether the fill material is located in the first and/or second phase state. It is in this regard, on the one hand, an option that continuously, sequentially and even upon need, for example, as a result of initializing on the part of the operator, it is detected, in which phase state the fill material is located. It is, however, likewise an option that, for example, solely, one change of the phase state is detectable, for example, automatically. In such case, it is, in turn, an option to detect a single change, or to detect a plurality of or all changes of phase state throughout the duration of operation of the apparatus.

Furthermore, the apparatus, for example, an electronics of the apparatus, or its detection unit, can be embodied to output a report relative to the phase state of the fill material or relative to a change of the phase state of the fill material.

A detecting of the phase change by means of a component of the apparatus is, however, not absolutely essential. A detection unit can, for example, also be provided detached from the process and as an independent unit. For example, it is, in this case, an option to check subsequently, thus, after removing the apparatus from the process, whether, for example, in the case of a failure of the sensor unit, the apparatus was exposed to a too high temperature. It can thus, upon the analysis of the cause for a defect, in given cases, be directly detected, whether the cause lies in the operating of the apparatus at too high temperatures.

In an embodiment of the apparatus, the sensor element is a temperature sensor, for example, comprising a resistance element or a thermocouple. The sensor element is preferably electrically connected via at least two connection wires, which are led at least partially through the filler surrounding the sensor element. When the filler is not electrically conducting, the at least two connection wires can, furthermore, be electrically insulated from one another by means of the fill substance.

The phase transformation temperature can, for example, be so selected that it corresponds to a temperature predeterminable for the particular process, in which the apparatus is applied, or to a temperature relevant for the apparatus.

A preferred embodiment of the apparatus provides that the fill material is selected in such a manner that a phase transformation temperature of the fill material corresponds to a predeterminable maximum use temperature, for example, a maximum allowable use temperature, for the apparatus, or to a predeterminable minimum use temperature, for example, a minimum allowable use temperature, for the apparatus. The phase transformation temperature can thus, correspond either to the maximum allowable use temperature or to the minimum allowable use temperature. It can, however, also be selected somewhat lower or higher than the maximum or minimum allowable use temperature, in order to prevent possible temperature related damage. In the case of maximum allowable use temperature, such damage can result, for example, from an overloading of the apparatus. The temperature separation between the maximum or minimum allowable use temperature and the phase transformation temperature can especially be selected in such a manner that an exceeding or subceeding can be safely prevented.

It is, furthermore, advantageous that the apparatus, especially the detection unit, be embodied, in the case of occurrence of the first and/or second phase state of the fill material, to output a report concerning whether the predeterminable maximum use temperature for the apparatus has been exceeded. In the case, in which the first and/or second phase state are/is detectable, a report, whether the predeterminable maximum use temperature was exceeded, can be ascertained based on the presence of the first or second phase state. In the case, in which a change of the phase state is detectable, a report concerning whether the predeterminable maximum use temperature was exceeded, can be output based on the change of the phase state.

In a preferred embodiment, upon the phase change of the fill material, a characteristic, physical and/or chemical variable of the fill material changes, especially abruptly, wherein the apparatus, especially the detection unit, is embodied to detect the first and/or second phase state based on a change of this variable.

The fill material is preferably a ferroelectric material, a ferromagnetic material, or a superconductor, for example, a high temperature superconductor. The at least one phase change is then corresponding to a phase change from the ferroelectric to the paraelectric state or, conversely, from the ferromagnetic to the paramagnetic state or from the superconducting state to the normally conducting state, or vice versa.

At the phase transformation temperature, there is a change of a specific material property of the fill material, based on which a certain phase state of the fill material can be ascertained. The material-specific changes are known for the selected fill material and can be taken into consideration for detecting the phase state.

The characteristic, physical or chemical variable can be, for example, a dielectric, electrical, or magnetic property of the material, for example, a magnetic or electrical polarization or remanence, a capacitance or an inductance, or a crystal structure or a volume.

An advantageous embodiment includes that, upon the phase change of the fill material, the electrical conductivity of the fill material changes, wherein the apparatus, especially the detection unit, is embodied to detect the first and/or second phase state based on a change of the electrical conductivity.

It is, furthermore, advantageous that the apparatus, especially the detection unit, is embodied to detect the change of the electrical conductivity of an insulation resistance formed by the fill material. An insulating resistance can be register metrologically especially easily.

An embodiment of the apparatus includes that the fill material is in the first phase state an electrical insulator. In such case, the fill material has a high insulating resistance. When the fill material, or the filler, is, at least in one phase state, an electrical insulator, in given cases, complex, separate insulation of components of the sensor unit, especially connection conductors at least partially led through the filler, can be omitted.

At the same time, the fill material is advantageously distinguished by a high thermal conductivity. In an embodiment, the thermal conductivity is further a function of temperature. In such case, the occurrence of a phase change can be ascertained based on the dynamic behavior of the thermometer as a function of temperature, for example, based on a response time of the apparatus.

An embodiment includes that the fill material in the first phase state is present in the form of a powder. The terminology, powder, includes in the context of the present invention also a powder of very small particle size, for example, even dust.

In an especially preferred embodiment of the invention, the phase change of the fill material is irreversible. In the case of an irreversible phase change, a change of the phase state needs to be detected only once. Advantageously, a passive detecting of the change of the phase state can be implemented. Thus, this embodiment can be implemented in especially easy manner. This concerns both the construction as well as also the metrological implementation.

Another especially preferred embodiment includes that the fill material is diamond. Diamond is in a first phase state an electrical insulator with especially high thermal conductivity. Especially for a field device in the form of a thermometer, such is of significant advantage. At the phase transformation temperature, diamond becomes graphite. This transition is accompanied by a change of the electrical conductivity. Thus, the phase state of the fill material can be detected in this embodiment in simple manner based on the electrical conductivity of the fill material.

The object of the invention is achieved, furthermore, by a method for state monitoring of an apparatus of the invention for determining and/or monitoring a process variable of a medium, comprising method steps as follows:

detecting whether the fill material is located in the first and/or second phase state, and ascertaining a state indicator for the apparatus, especially based on the first and/or second phase state.

In an embodiment of the method, the state indicator is ascertained based on at least one, especially abrupt, change of at least one characteristic, physical and/or chemical variable of the fill material.

In an additional embodiment of the method, the state indicator provides information concerning thermal loading of the apparatus, especially of the sensor element. The thermal loading, especially overloading, can, in such case, have taken place also exclusively in the past. In such case, the method enables an indication of a no longer present, temperature related overloading. Such can be helpful, for example, for the analysis of defects of the apparatus.

The embodiments explained in connection with the apparatus can be applied mutatis mutandis also to the method of the invention and vice versa.

BRIEF DESCRIPTION OF THE DRAWINGS

The invention will now be explained in greater detail based on the appended drawing, the figures of which show as follows.

Figure 1:
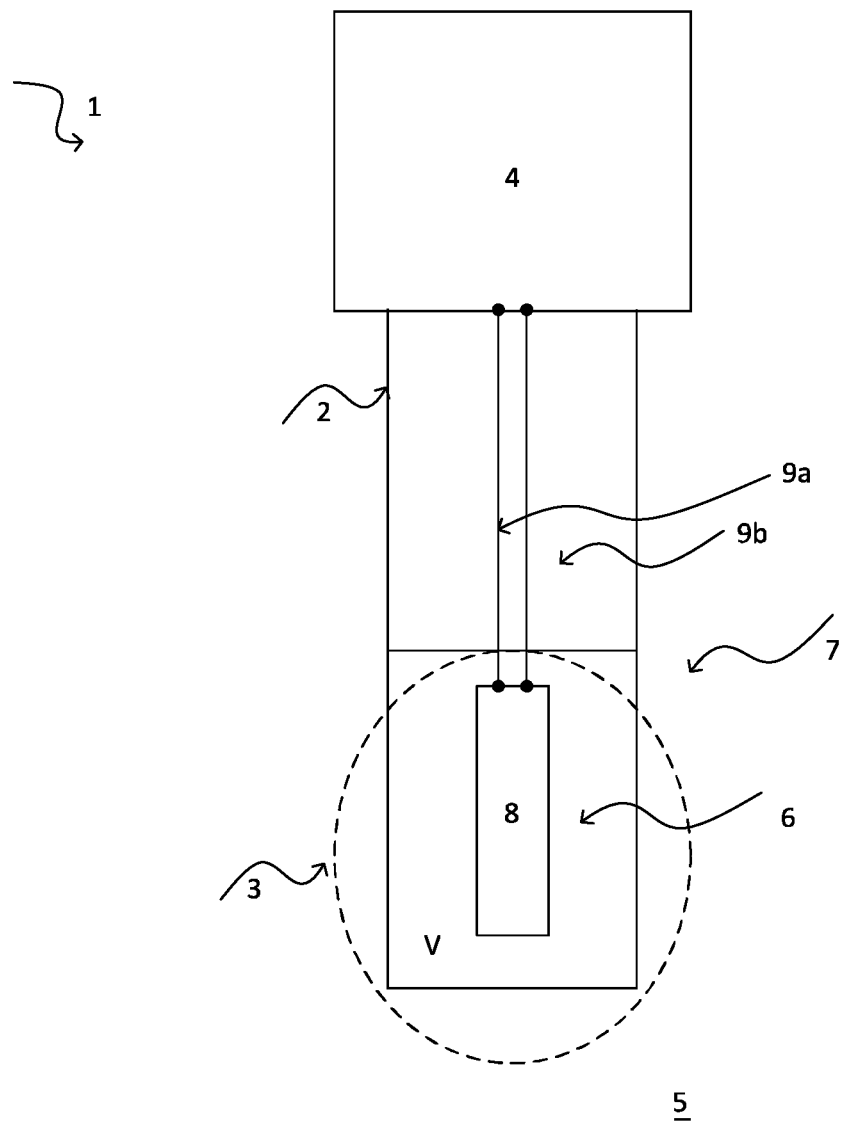
FIG. 1 shows a schematic view of a thermometer having a sensor element arranged in a sensor head according to the state of the art.

In the figures, equal elements are provided with equal reference characters.

DETAILED DESCRIPTION

Without intending to limit the general applicability of the invention, the following description concerns field devices in the form of thermometers. Likewise without intending to limit the general applicability of the invention, the particular sensor elements comprise, in each case, a resistance element contacted via two connection wires.

Shown in FIG. 1 is a schematic illustration of a thermometer 1 having a protective tube 2 and an electronics unit 4 according to the state of the art. The portion of the protective tube 2 facing the medium 5 is also referred to as the sensor head 3. A portion of the internal volume V of the sensor head 3 is filled with a filler 6, for example, a ceramic potting compound. Further arranged in the internal volume V of the sensor head 3 is a sensor element 7, which in the illustrated embodiment comprises a temperature sensor 8 in the form of a resistance element and two connection wires 9a, 9b for electrical connection with the electronics unit 5. The temperature sensor 7 as well as a subsection of the connection wires 9a,9b are embedded and/or encapsulated by the filler 6 within the volume V of the sensor head 3. This leads to an especially high mechanical stability and vibration resistance of the thermometer 1.

Figure 2:
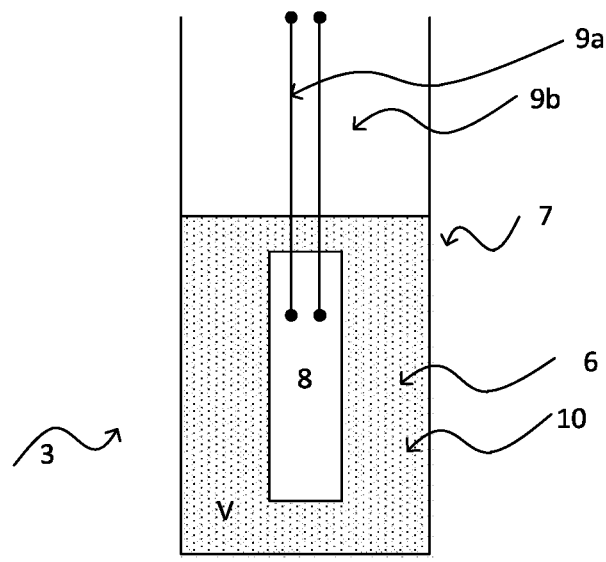
FIG. 2 shows a schematic view of a thermometer of the present disclosure.

According to the invention, as shown in FIG. 2 by way of example, the filler 6 comprises a fill material 10, in the case of which a phase change occurs at a predeterminable phase transformation temperature $T_P$, in the case of which phase change the material remains in the solid state. The phase transformation temperature $T_P$ of the fill material 10 is, in such case, so selected that it corresponds to a predeterminable maximum use temperature for the apparatus 1, or for at least one component of the apparatus 1, for example, the sensor element 8. The fill material 10 is located in a first phase state $P_1$, in case of a temperature T of the fill material 10 is less than the phase change temperature $T_P$, and in a second phase state $P_2$, in case the temperature T of the fill material 10 is greater than the phase change temperature $T_P$.

FIG. 2 shows the filler 6 completely in the form of the fill material 10. In other embodiments, the filler 6 can, however, also be a mixture of the fill material 10 and at least one additional material. Likewise it is an option to fill a first portion of the internal volume V of the sensor head 3 with the fill material 10, and at least one additional portion of the internal volume V of the sensor head 3 with another material different from the fill material.

At the phase change of the fill material 10, thus, at the phase transformation temperature $T_P$, there changes, especially abruptly, at least one characteristic, physical and/or chemical variable of the fill material 10. Based on such change, the first $P_1$ and/or second phase state $P_2$ can be detected.

Figure 3:
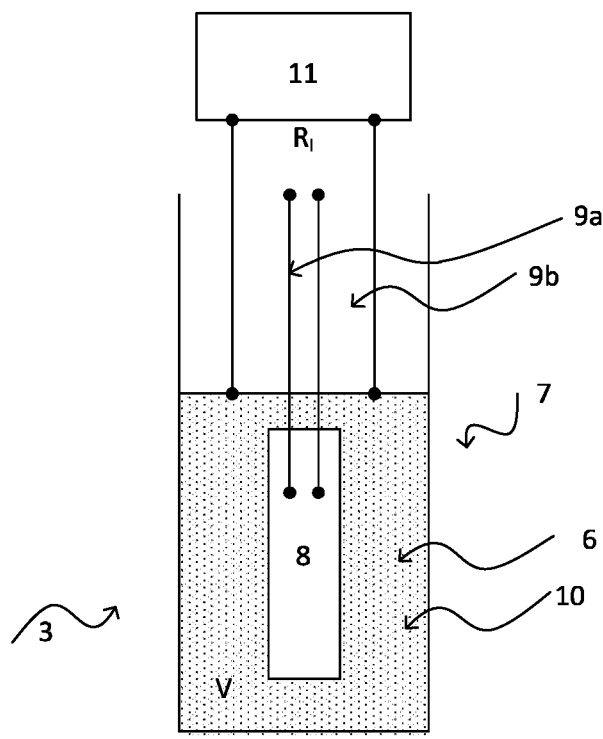
FIG. 3 shows a schematic view of a thermometer of the present disclosure with detection unit.

FIG. 3 shows an apparatus 1 of the invention having a detection unit 11, which is embodied to detect the first $P_1$ and/or second phase state $P_2$ based on a change of the conductivity of the fill material 10. In such case, the insulating resistance R, formed by at least the fill material 10 is a measure of the conductivity, and, thus, the presence of the first $P_1$ and/or second phase state $P_2$.

It is to be noted here that in the context of the present invention a separate detection unit 11 is not absolutely necessary. On the one hand, a detection unit can be part of the electronics unit 4. On the other hand, in many embodiments, a detection unit 11 is not necessary, for example, in the case of a passive detecting of the phase state $P_1$ or $P_2$ of the fill material, or of a change of the phase state. Likewise, the detecting of the phase change shown in FIGS. 3 and 4 based on the conductivity is only by way of example. Rather, also other characteristic, physical or chemical variables of the fill material 10 can be taken into consideration for detecting the phase change.

Figure 4A:
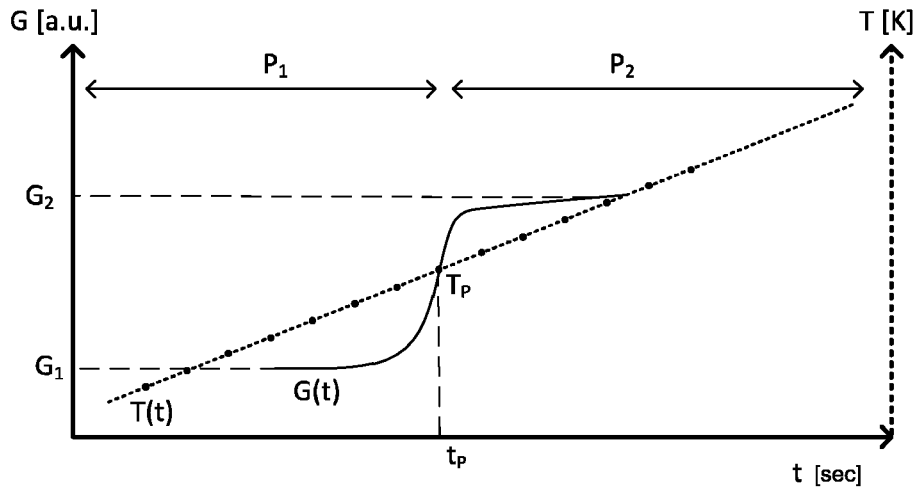
FIGS. 4a-4c show schematically, as functions of time, a characteristic variable (in arbitrary units) of a fill material of the present disclosure showing occurrences of phase changes.

FIG. 4a shows, finally, by way of example, schematically, the function of time of a characteristic variable G, for example, the conductivity, of the fill material 10 as well as of the temperature T of the apparatus 1, in each case, in arbitrary units. At the phase transformation temperature $T_P$, an abrupt change of the variable G occurs. As shown in FIG. 4a, the variable G changes at the phase transformation temperature $T_P$ from a first value $G_1$ to a second, higher value $G_2$. For temperatures $T<T_P$, the fill material is located in the first phase state $P_1$, and, for temperatures $T>T_P$, the fill material is located in the second phase state $P_2$.

Of course, in other embodiments, also a lessening of the variable G from a first $G_1$ to a second lower value $G_2$ can equally occur at the phase transformation temperature $T_P$. Also, an option is that for the fill material 10 a plurality of phase changes can occur at different phase transformation temperatures $T_P$. For example, by means of a suitably embodied fill material 10, in the case of which two phase changes occur, both the exceeding of a predeterminable first temperature corresponding to a first phase transformation temperature of a first phase change and the subceeding of a predeterminable second temperature corresponding to a second phase transformation temperature of a second phase change can be ascertained. In the case of taking into consideration a plurality of phase changes, in such case, at least two phase changes can be detected based on the same characteristic variable G as well as also at least two phase changes based on two different characteristic variables G. Let it, finally, likewise be noted that, besides the mentioned embodiments, numerous other embodiments provide options, which all fall within the scope of the present invention.

Figure 4B:
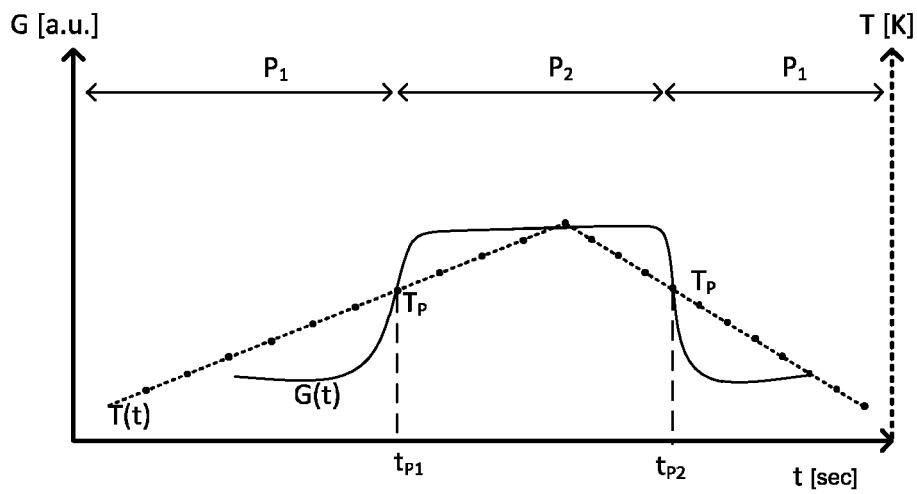
Figure 4C:
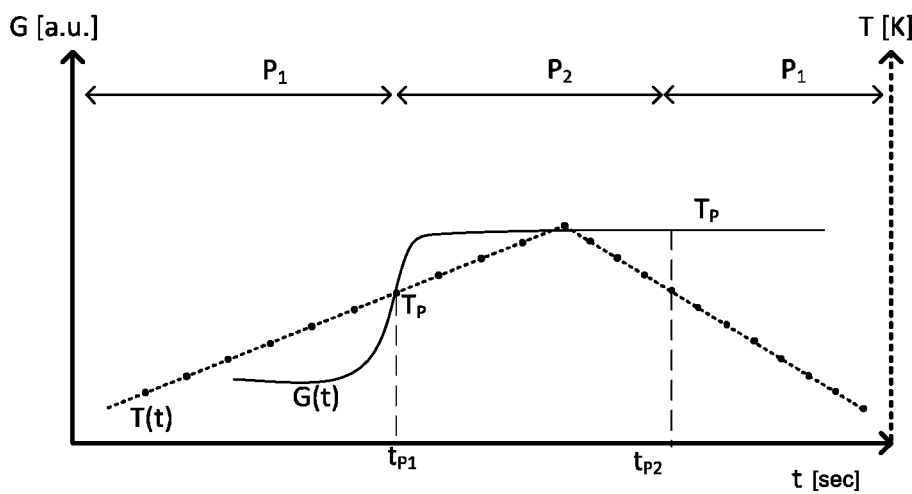

FIG. 4b and FIG. 4c show, finally, in each case, schematically the behavior of the characteristic variable G in the case of a reversible (FIG. 4b) and an irreversible (FIG. 4c) phase change. If the temperature T exceeds at a first point in time $t_{P1}$ the phase transformation temperature $T_P$, then the variable G changes at the phase transformation temperature $T_P$ from a first value $G_1$ to a second, higher value $G_2$. In such case, for temperatures $T<T_P$ the fill material 10 is located in the first phase state $P_1$, and for temperatures $T>T_P$ in the second phase state $P_2$. In the case of a following decline of the temperature T, in such a manner that the temperature at a second point in time $t_{P2}$ subceeds the phase transformation temperature, the variable G in the case of a reversible state for temperatures $T<T_P$ goes back to the first value $G_1$ (compare FIG. 4b). In the case of an irreversible phase change, in contrast, the second value $G_2$ remains high (compare FIG. 4c). In the case of an irreversible phase change, thus, alone based on a detecting of the second value $G_2$ for the characteristic variable G, it can be known that a phase change occurred.

The invention claimed is:

1. An apparatus configured to determine and/or monitor a process variable of a medium, the apparatus comprising:
    a sensor element disposed in a sensor head and configured to determine and/or monitor the process variable of the medium, wherein the sensor head includes an internal volume in which the sensor element is disposed; and
    a filler that at least partially fills at least one portion of the internal volume, wherein the filler comprises at least one fill material for which a phase change occurs at at least one phase transformation temperature, at which the fill material A remains in a solid state,
    wherein the fill material is in a first phase state when a temperature of the fill material is less than the phase transformation temperature, wherein the fill material is an electrical insulator in the first phase state, and
    wherein the fill material is in a second phase state when the temperature of the fill material is greater than the phase transformation temperature.

2. The apparatus of claim 1, further comprising a detection unit configured to detect whether the fill material is in the first phase state or the second phase state.

3. The apparatus of claim 1, wherein the fill material is composed such that, upon the phase change of the fill material, a characteristic, physical and/or chemical variable of the fill material changes, and wherein the apparatus is configured to detect the first phase state and/or the second phase state based on a change of the characteristic, physical and/or chemical variable.

4. The apparatus of claim 1, wherein the fill material is in powder form in the first phase state.

5. The apparatus of claim 1, wherein the sensor element is a temperature sensor.

6. The apparatus of claim 5, wherein the temperature sensor is a resistance element or a thermocouple.

7. The apparatus of claim 1, wherein, upon the phase change of the fill material, an electrical conductivity of the fill material changes, and wherein the apparatus is configured to detect the first phase state and/or the second phase state based on a change of the electrical conductivity.

8. The apparatus of claim 7, wherein the apparatus is configured to detect the change of the electrical conductivity of an insulation resistance formed by the fill material.

9. The apparatus of claim 1, wherein the phase change of the fill material is irreversible.

10. The apparatus of claim 9, wherein the fill material is diamond.

11. The apparatus of claim 1, wherein the at least one phase transformation temperature of the fill material corresponds to a maximum use temperature or to a minimum use temperature.

12. The apparatus of claim 11, wherein the maximum use temperature is a maximum allowable use temperature of the apparatus, or the minimum use temperature is a minimum allowable use temperature of the apparatus.

13. The apparatus of claim 12, further comprising a detection unit configured to detect whether the fill material is in the first phase state or the second phase state, wherein the detection unit is further configured to output a report, with an occurrence of the first phase state and/or the second phase state of the fill material, as to whether the maximum use temperature of the apparatus has been exceeded.

14. A method for state monitoring of an apparatus configured for determining and/or monitoring a process variable of a medium, the method comprising:
   providing the apparatus, comprising:
      a sensor element disposed in a sensor head and configured to determine and/or monitor the process variable of the medium, wherein the sensor head includes an internal volume in which the sensor element is disposed; and
      a filler that at least partially fills at least one portion of the internal volume, wherein the filler comprises at least one fill material for which a phase change occurs at at least one phase transformation temperature, at which the fill material remains in a solid state,
      wherein the fill material is in a first phase state when a temperature of the fill material is less than the phase transformation temperature, wherein the fill material is an electrical insulator in the first phase state, and wherein the fill material is in a second phase state when the temperature of the fill material is greater than the phase transformation temperature;
   detecting whether the fill material is in the first phase state and/or the second phase state; and
   determining a state indicator for the apparatus based on the first phase state and/or the second phase state.

15. The method of claim 14, wherein the state indicator is determined based on at least one change of at least one characteristic, physical and/or chemical variable of the fill material.

16. The method of claim 14, wherein the state indicator includes information regarding thermal loading of the sensor element.

* * * * *